Dec. 4, 1945.   T. A. BOWERS   2,390,044
PISTON RING
Filed May 31, 1939
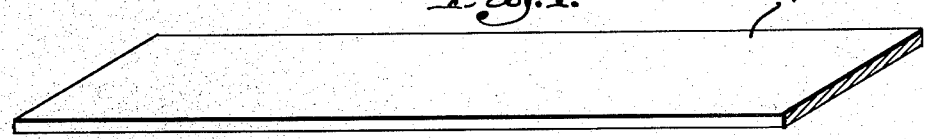
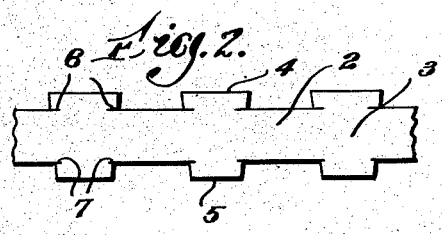
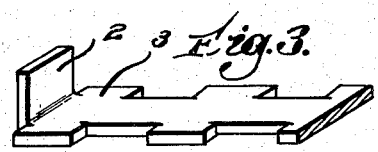
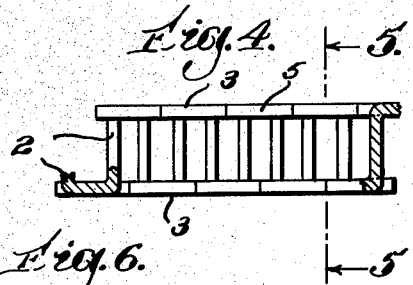
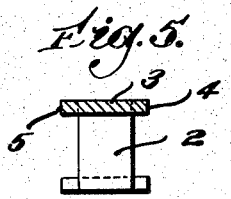
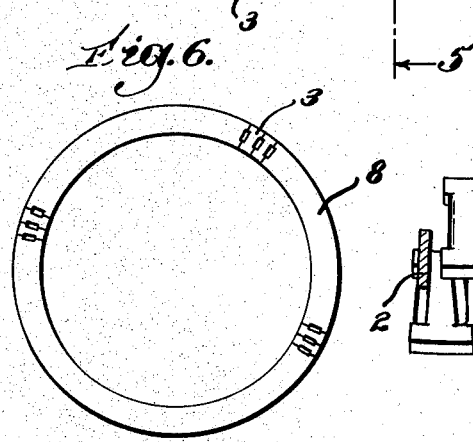
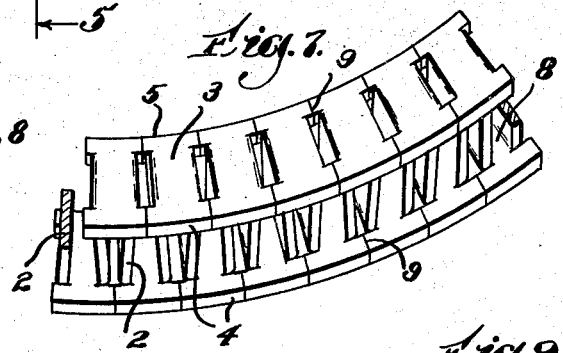
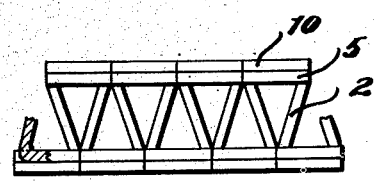
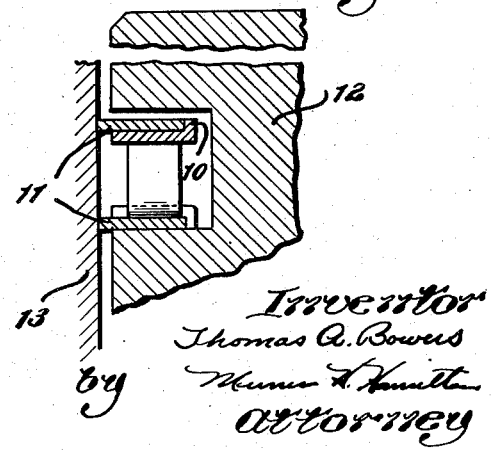
Inventor
Thomas A. Bowers
by
Attorney Patented Dec. 4, 1945

2,390,044

UNITED STATES PATENT OFFICE 2,390,044

PISTON RING

Thomas A. Bowers, Boston, Mass., assignor to Power Research Corporation, Boston, Mass., a corporation of Massachusetts Application May 31, 1939, Serial No. 276,503

4 Claims. (Cl. 309—45)

This invention relates to piston rings of the oil metering type.

During operation of a motor it is necessary that a film of oil suitable for effecting proper lubrication of sealing members be maintained on the cylinder but it is desirable that no excess of oil be left sufficient to pass by the sealing members to become burned by combustion gases or to collect in the head of the cylinder, thereby to reduce engine efficiency and create excess oil consumption. Difficulty is experienced in fulfilling these conditions especially in cylinders which have been worn "tapered" or "out-of-round." C-type oil rings, as hitherto employed, have been beveled to present a single scraping edge, or recessed to present top and bottom scraping edges. These rings fail to become completely expanded against the worn areas of the cylinder referred to, either due to slowness in expansibility or non-uniformity in expansion pressure resulting from the split construction of C-type rings. This results in inefficient oil scraping. Also openings, provided through the oil rings for the oil to pass through and back into the crank case, tend to become clogged. Increasing the size of the openings weakens the ring body and the size of the openings therefore is necessarily limited.

In high-speed motors, these difficulties become magnified and in an attempt to overcome them structures have been proposed comprising light C-type scraper rings having a plurality of scraping edges spaced apart by a slotted solid C-type ring and maintained against the cylinder wall by means of a separate expander member of strongly resilient character. Such assemblies while of faster operation are still limited in expansibility and their expansion is non-uniform on the cylinder. In addition they are much more expensive and more difficult to assemble.

A principal object of this invention is to provide an improved oil ring and to provide oil control means designed to overcome the difficulties above outlined. The invention also aims to present improved expander means.

This application is a continuation in part of my co-pending application Ser. No. 268,721, filed April 19, 1939. Reference is further made to my co-pending application Ser. No. 276,503, filed May 31, 1939.

In the accompanying drawing:

Figure 1 is a perspective view illustrating a length of material employed in making my fabricated oil control ring.

Fig. 2 is a plan view indicating a length of material after portions thereof have been cut away as illustrative of a step in the formation of an oil ring.

Fig. 3 is a perspective view illustrating another step in the formation of an oil ring.

Fig. 4 is a view in side elevation and partial cross section illustrating still another step in the formation of an oil ring.

Fig. 5 is a cross section taken on the line 5—5 of Fig. 4.

Fig. 6 is a plan view of a finished oil ring.

Fig. 7 is a fragmentary perspective view of a finished ring such as that shown in Fig. 6, more clearly indicating the arrangement of the ring portions.

Fig. 8 is a view in side elevation illustrating the association of scraper rings with my fabricated ring material, and also illustrating a modification of the material; and Fig. 9 is a fragmentary view in cross section of a cylinder and piston illustrating a ring member such as that indicated in Fig. 8 associated therewith.

According to my invention I provide a length of ribbon-like material 1 which preferably will be composed of steel, alloy, or other suitable compositions and from which I fabricate a unitary oil ring structure presenting oil scraping edges. This material is sheet metal and when this term is used throughout the specification and claims it is to be understood as referring to metal formed by rolling, drawing or like processing, as distinguished from cast metal. Figs. 1 to 7 inclusive relate to a preferred embodiment of the invention. Figs. 8 and 9 illustrate an expander modification.

As an example of one means of fabricating an oil ring structure from the material 1, I treat the material in the manner illustrated in Figs. 1-6 inclusive. The ribbon is punched or cut out with a die or other suitable member as illustrated in Fig. 2 where it will be observed that there have been formed portions 2 of somewhat narrow form, portions 3 of a substantially wedge-shape or keystone formation having wide edges 4 and narrow edges 5, and slits 6 and 7 of which slits 6 are longer than slits 7.

The punched ribbon is then reversely bent upon itself so that the portions 2 take an upright position to comprise web members as illustrated in Fig. 3, and the remaining portions 3 become T-shaped at inner and outer sides to constitute crown members as illustrated in Fig. 4. Where the term "crown" is used in the specification and claims it is to be understood as referring to the entire top or bottom plane portion of the device. It should be noted that the crowns 3 have portions extending beyond the webs in a direction circumferentially of the ring so that spaces occur between the webs for passing oil through the ring.

By means of the crown portions 3 having been formed with a keystone shape while slits 6 on one side of the material have been made longer than slits 7 of the opposite side, the material when folded may take an annular form and comprise a ring 8 such as has been illustrated in Figs. 6 and 7.

In a completely folded state the edges 4 of the crown portions 3 take positions adjacent one another and present substantially continuous relieved outer edges which are particularly adapted to acting as scraper rings for metering oil and comprising a satisfactory substitute for those separate scraper rings of the type above referred to.

The web portions 2 take the place of a separate spacing member such as has been employed in the separate scraper ring assemblies referred to, and the webs from being constructed narrow relative to the crowns take up a position out of contact with the cylinder at all times. In addition since webs 2 are narrower than the crowns 3 they will tend to flex or bend before the crowns will and thereby may provide circumferential take-up and ensure maintenance of the crowns in a substantially flat state at all times. The position assumed by the webs results in an open fabricated structure admirably suited to comprising oil passages with respect to oil passing either vertically or radially of the ring between the scraper portions for oil to be repassed through the piston and back to the crank case, and there is eliminated the need for carrying out expensive milling or other cutting operations to effect oil passages in solid spacing members as heretofore resorted to.

The ring of material illustrated in Figs. 6 and 7 presents a still further desirable characteristic especially in connection with taking the place of an expander in the separate scraper ring assembly above used for purposes of comparison. My improved ring furnishes its own expansibility, obviating the provision of a separate expansive expander member, and moreover my ring furnishes a superior type of expansibility.

The material, due to its being reversely folded and compacted may if composed of a suitably springy material, be highly expansible and contractible. When compressed into a closed circle it may exert a radial force, uniformly in all directions, adapted to deliver a very efficient wall pressure when properly received in a cylinder. It should be noted that this wall pressure is of wide range and is radially uniform when compared with a wall pressure which is obtained from a C-type ring which is of limited range and non-uniform, occurring with the greatest intensity at the ends of the split ring which tend to expand into a greater diameter. The greater expansibility thus available is highly useful in adapting the ring of my invention to use in cylinders badly worn "out-of-round" or worn "tapered" and in effecting a complete wiping or metering action in such cylinder at high speed.

In the ring 8 the crown portions 3 abut along points 9 as illustrated in Figs. 6 and 7. Upon expansion of rings of this type or with rings cut out so that they do not entirely abut there may occur gaps. In employing the outer edges 4 of the ring 8 to act as scraping edges on a cylinder, such gaps might be considered as objectionable. However, it will be noted that I have arranged for these gaps to occur in staggered relationship so that a gap on one edge is covered by a solid edge at a correspondingly opposite point.

It will be noted that the web members 2 may occur either in a substantially vertical position such as that already referred to and illustrated in Fig. 4, or they may occur in a slightly inclined position such as has been illustrated in Fig. 7 and to a greater extent in Fig. 8. The degree of angularity which the webs may have may be determined by the depth of the cuts 6 and 7 and may be varied as desired with it being understood that the crown portions 3 may be spaced apart to any extent desired, whereby compressibility in a ring of the material would be increased.

In Fig. 8 I have illustrated a modification of the ring structure already described in which the inner edges 5 of the crowns have been upturned to form retaining ends 10 suitable for radially supporting separate scraping ring members 11 which may be associated with this structure if desired; and I have illustrated an assembly in Fig. 9 of piston 12 and cylinder 13 having such a ring assembly associated therewith.

The material may be employed as a simple expander member either with or without the bending operation described in reference to Fig. 8, and it is again pointed out that in functioning as an expander the material exerts a radial force outwards which is uniform in all directions as compared wtih the non-uniform radial expansibility exerted by a C-type ring member.

It will also be observed that the ring comprises an open structure suitable for allowing easy passage of oil therethrough and into drain openings in the piston of conventional nature, and there has been effected the preferred light scraping edge construction found to be more effective in high-speed motor operation and that both of these objectives have been obtained in a structure comprising a unitary member.

I claim:

1. A piston ring comprising a strip of sheet metal reversely bent to form crowns and connecting webs, said crowns being I-shaped.

2. A piston ring comprising a corrugated strip of sheet material in which the lines of folding extend radially of the ring, the structure comprising crowns and connecting webs, said crowns being I-shaped and extending beyond the webs, in a direction radially of the ring, at both the inner and outer peripheries of the ring, the heads of said I-shaped portions being aligned at the outer periphery of the ring to define an oil scraping edge.

3. A packing ring formed from corrugated sheet material in which the lines of folding extend radially of the ring, the structure comprising crowns and connecting webs, the crowns comprising a plurality of I-shaped portions with the heads thereof projecting beyond the webs at both the inner and the outer peripheries of the ring.

4. A packing ring comprising a strip of sheet metal reversely bent to form a corrugated structure in which the lines of folding extend radially of the ring, the structure including crowns and connecting webs, the crowns comprising rows of I-shaped portions at both the inner and outer peripheries of the ring, legs of said I-shaped portions being common to heads thereof at both inner and outer rows.

THOMAS A. BOWERS.